Patented June 1, 1926.

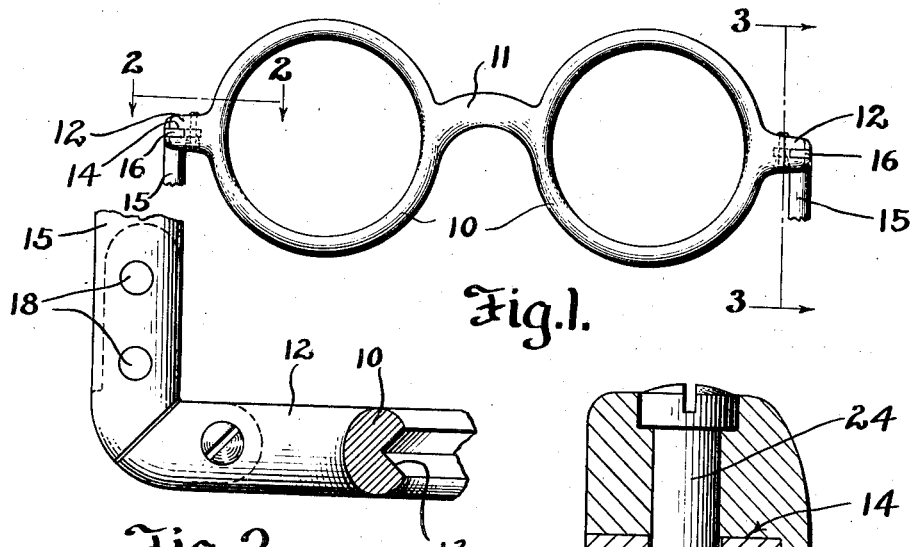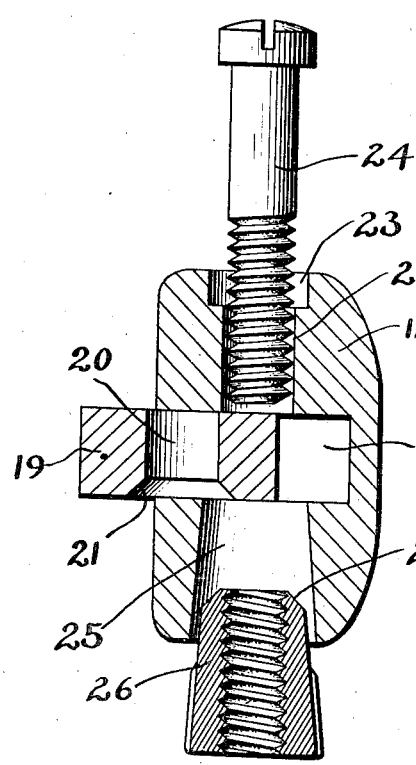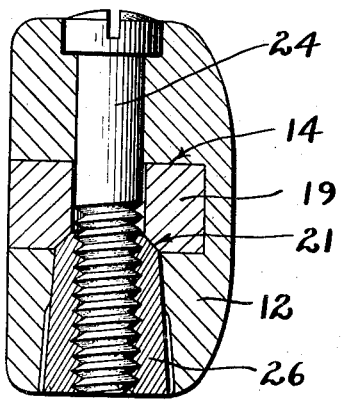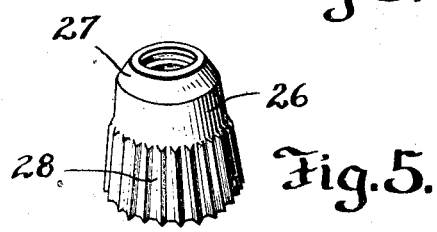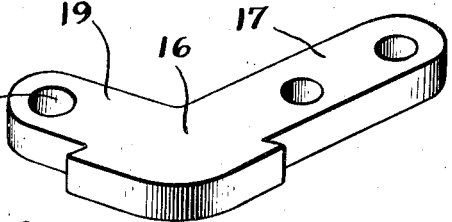

1,587,102

UNITED STATES PATENT OFFICE.

WILLIAM J. WRIGHTON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed October 29, 1924. Serial No. 746,529.

This invention relates to improvements in ophthalmic mountings and has particular reference to the provisions of an improved temple connection especially adapted for use with all zylonite or other similar nonmetallic mountings.

An important object of the present invention is to provide an improved temple connection for spectacles wherein the temple will be firmly held and prevented from working loose.

Another object of the invention is to provide such a device wherein the temple connection is constructed with a tapered frictional bearing surface whereby the temple is held against dropping.

Still another object of the invention is to provide a nonmetallic endpiece for a temple connection wherein the usual pivoting screw is engaged by a temple clamping nut so that there will be no possibility of the thread in the endpiece becoming stripped.

Another object is to provide a temple connection for nonmetallic frames which will be strong and durable in service, economical in manufacture, and an improvement in the art.

With these and other objects in view, the invention resides in the novel features of construction, combination and arrangement of parts hereinafter fully set forth, illustrated in the accompanying drawings, and specifically pointed out in the appended claims.

In the drawings forming a part of this specification, I have illustrated a preferred embodiment of the invention wherein—

Figure 1 is a front elevation of an improved spectacle frame fitted with a temple connection embodying the invention.

Figure 2 is an enlarged fragmentary plan view of the endpiece and forward end of the temple.

Figure 3 is a vertical transverse sectional view on the line 3—3 of Figure 1.

Figure 4 is a similar view showing the parts in disassociated position.

Figure 5 is a detail perspective view of the temple clamping nut.

Figure 6 is a detail perspective view of the metallic hinge member.

Similar reference characters designate corresponding parts throughout the several views.

In Figure 1 is illustrated a spectacle frame having a pair of lens receiving rims 10 connected by an integral bridge member 11 and having at their opposite sides outwardly extending endpieces 12. The spectacle frame so formed is preferably produced from a single piece of material such as zylonite or other nonmetallic substance and preferably formed to simulate tortoise shell in appearance. The lens rims 10 are internally grooved as at 13 for the reception of a lens and the endpiece members 12 are slotted as at 14 to provide a connection for the hinged end of a temple 15.

Secured in the forward extremity of the temple 15 is a hinge plate generally designated by the reference character 16 which is preferably stamped from sheet material and comprising a rearwardly extending arm 17 which is embedded in the temple and securely held in place by means of rivets 18 or other suitable fastening elements, and a right angularly disposed arm 19 which is adapted to work in the slot 14 in the endpiece. The arm 19 is apertured as at 20 adjacent its end and the bottom surface of said aperture is countersunk as at 21 for a purpose to be hereinafter described.

Extending through the endpiece 12 in a direction at right angles to the slot 14 is a hole 22 which is counterbored at its upper end as at 23 for the reception of a pivoting screw 24. Below the slot 14, the aperture is enlarged in diameter and tapered as clearly shown at 25 for the reception of a clamping nut 26. The screw 24 extends through the hole 20 in the hinge member and engages the threads within the clamping nut 26. The upper end of the nut 26 is tapered as at 27 to the same angle as the countersink 21 so that as the screw 24 is turned the nut 26 is drawn into the nonmetallic endpiece and the tapered end thereof enters the countersink 21 and is firmly held in frictional engagement therewith.

If desired, the outer surface of the nut 26 may be knurled or otherwise suitably roughened as illustrated at 28, whereby, as the member is drawn into the endpiece it will be firmly anchored and held against rotation.

From the foregoing it will be seen that an improved temple connection has been produced for nonmetallic frames such as those formed of zylonite wherein the temple will be firmly held in frictional engagement in such a way that it cannot work loose or what is known in the trade as "drop".

Another advantage of this improved construction lies in the fact that the clamping screw 24 engages a metallic threaded member 26 so that the threads thereof will not become stripped. Prior to this invention, some attempts have been made to engage screws in nonmetallic material but they have not been successful because said material has not had sufficient mechanical strength to maintain the threads.

The improved construction is a simple one which will be strong and durable in service, and economical to produce. Obviously, changes may be resorted to in the minor details of construction and arrangement of parts and the right is herein reserved to make such changes falling within the scope of the appended claims without departing from the spirit of the invention.

Having thus described my invention what is claimed is:

1. An ophthalmic mounting comprising a nonmetallic endpiece having a slot, a temple having a hinge leaf disposed in the slot, a pivot screw extending through the endpiece and hinge leaf at right angles thereto, and a metallic nut anchored in the endpiece and having a portion extending into the hinge leaf for frictional engagement therewith.

2. In a device of the character described, an endpiece for a spectacle frame, a hinge member pivoted in said endpiece and provided with a countersunk aperture, a screw extending through the endpiece and hinge member, and a clamping nut engaged by the screw and held against rotation in the endpiece, said clamping nut having a tapered portion in frictional engagement with the countersunk aperture of the hinge member.

3. In a device of the character described, an end piece member having a hinge recess and a pivot opening, a hinge member in the hinge recess having a countersunk opening in line with the pivot opening, a friction member in the pivot opening having a tapered portion engaging the countersunk portion of the hinge member and a retaining pivot member in the pivot opening in the end piece passing through the hinge member and friction member to hold them in aligned position.

4. In a device of the character described, an end piece member having a hinge recess and a pivot opening, a hinge member in the hinge recess having an opening in line with the pivot opening, a friction member in the pivot opening adapted to frictionally engage one side of the hinge member, and a retaining pivot member in the pivot opening passing through the hinge member and retaining member to hold them in alignment and frictionally engaged.

5. In a device of the character described, an end piece member having a hinge recess and a pivot opening, a hinge member in the hinge recess having a countersunk portion in line with the pivot opening, a tapered nut in the pivot opening having means for non-rotatably holding it in the pivot opening and having a tapered portion adapted to engage the countersink in the hinge member and a retaining pivot member in the pivot opening passing through the hinge member and tapered nut to hold them in alignment and in frictional engagement.

6. In a device of the character described, an end piece having a hinge recess and a pivot opening, a hinge member in the recess having a pivot opening in line with the pivot opening in the end piece, a friction member non-rotatably held in the pivot opening in the end piece with one face frictionally engaging one face of the hinge member, and means to pivot the hinge member and to hold the friction member in frictional engagement therewith.

WILLIAM J. WRIGHTON.